(12) United States Patent
Jerbi et al.

(10) Patent No.: US 8,208,382 B2
(45) Date of Patent: Jun. 26, 2012

(54) METHOD FOR ESTIMATING AND SIGNALLING THE DENSITY OF MOBILE NODES IN A ROAD NETWORK

(75) Inventors: Moez Jerbi, Lannion (FR); Tinku Mohamed-Rasheed, Trento (IT); Sidi-Mohammed Senouci, Lannion (FR)

(73) Assignee: France Telecom, Paris (FR)

( * ) Notice: Subject to any disclaimer, the term of this patent is extended or adjusted under 35 U.S.C. 154(b) by 331 days.

(21) Appl. No.: 12/526,256

(22) PCT Filed: Feb. 1, 2008

(86) PCT No.: PCT/FR2008/050172
§ 371 (c)(1),
(2), (4) Date: Aug. 6, 2009

(87) PCT Pub. No.: WO2008/104673
PCT Pub. Date: Sep. 4, 2008

(65) Prior Publication Data
US 2009/0323549 A1    Dec. 31, 2009

(30) Foreign Application Priority Data
Feb. 9, 2007  (FR) .................................... 07 53164

(51) Int. Cl.
*H04L 12/28* (2006.01)
*G05D 1/02* (2006.01)

(52) U.S. Cl. ......... 370/241; 370/254; 370/476; 701/300
(58) Field of Classification Search .................. 370/241, 370/254, 476; 701/300
See application file for complete search history.

(56) References Cited

U.S. PATENT DOCUMENTS
7,565,148 B2 * 7/2009 Alicherry et al. ............. 455/446

OTHER PUBLICATIONS

M.H. Raza et al., "Determining Density in Ad hoc Networks", Electrical and Computer Engineering, Canadian Conference, pp. 2160-2163, May 2006.
T. Nadeem et al., "TrafficView: Traffic Data Dissemination using Car-to-Car Communication", ACM Mobile Computing and Communications Review (MC2R), Special Issue on Mobile Data Management, vol. 8, No. 3, pp. 6-7, http://ww.cs.rutgers.edu/ {iftode/tv04.pdf>, Jul. 2004.
L. Wischoff et al., "SOTIS—a self-organizing traffic information system", VTC 2003, IEEE Semiannual Vehicular Technology Conference Proceedings, vol. 4 of 4, pp. 2442-2446, Apr. 22, 2003.

* cited by examiner

*Primary Examiner* — Kevin C Harper
(74) *Attorney, Agent, or Firm* — Cozen O'Connor

(57) ABSTRACT

A method and an associated device for estimating the density of mobile node traffic in an ad-hoc network on the roads of a predetermined geographical network in which mobile nodes move. Each road is divided into coverage cells. For each cell, a principal mobile node located at the center of the cell counts the number of nodes in the cell, and inserts this number into a cell density packet (CDP) transmitted from cell to cell during a first stage.

14 Claims, 8 Drawing Sheets

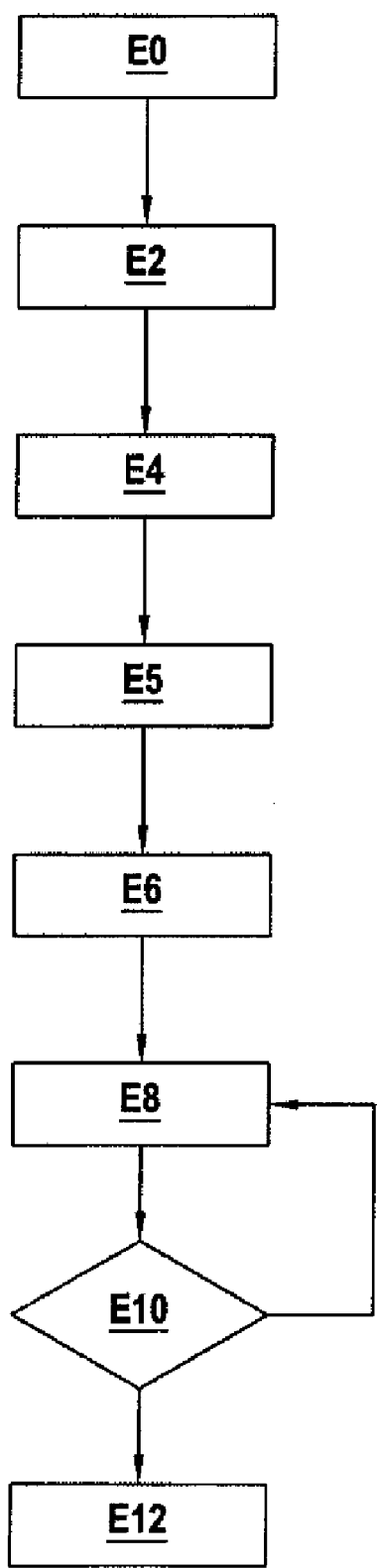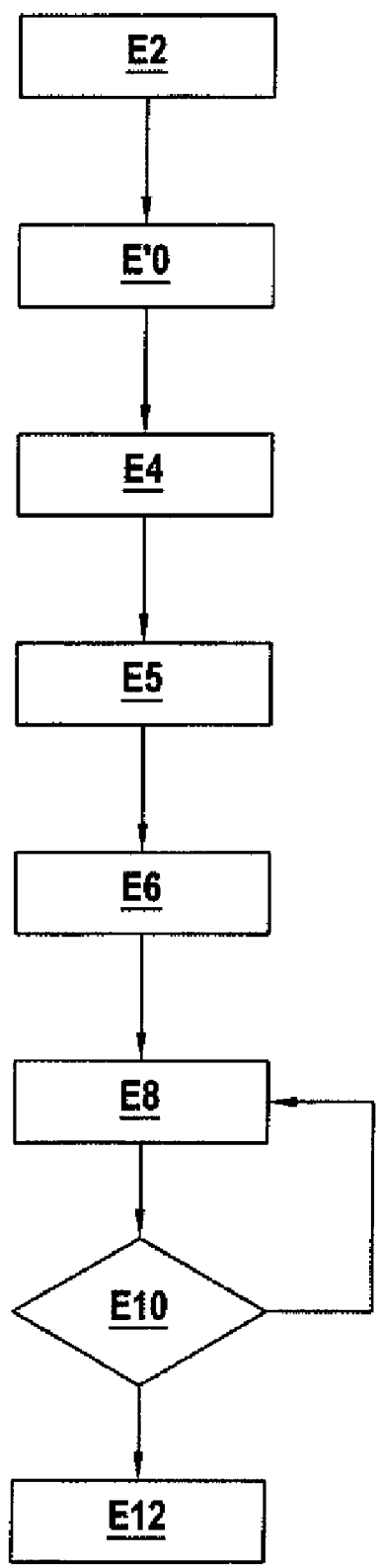
FIG.3A  FIG.3B

METHOD FOR ESTIMATING AND SIGNALLING THE DENSITY OF MOBILE NODES IN A ROAD NETWORK

RELATED APPLICATIONS

This is a U.S. National Phase Application under 35 USC §371 of International Application PCT/FR2008/050172, filed on Feb. 1, 2008.

This application claims the priority of French application no. 07/53164 filed on Feb. 9, 2007, and the content of which is hereby incorporated by reference.

FIELD OF THE INVENTION

Background of the Invention

The field of the present invention is that of intervehicular communications networks.

An intervehicular communications network, also known as a vehicular ad hoc network (VANET), is an ad hoc mobile network including mobile nodes (vehicles) moving on roads and communicating with one another by radio, thus forming a communications network.

The invention relates more particularly to a decentralized method of estimating the density of mobile nodes in an intervehicular communications network and broadcasting that information via the nodes of the network, each node moving along roads of a particular geographical network, the roads forming intersections.

As is known in the art, each mobile node of an intervehicular communications network is able to determine its location in a geographical network and is adapted to maintain an up-to-date neighbor table containing information relating to the positions of its neighbor nodes.

Each node calculates its local road traffic conditions from its own neighbor table. Each node then broadcasts information about its local traffic conditions to all its neighbor nodes at regular time intervals.

Broadcasting on this massive scale can lead to saturation of the bandwidth of the network, especially if the road network includes a large number of nodes. Moreover, given that two neighbor nodes share the same general local traffic conditions, calculating the traffic conditions at each mobile node implies a redundancy that is reflected not only at the calculation level but also at the level of broadcasting those traffic conditions. Two neighbor nodes provide generally the same traffic condition information.

OBJECT AND SUMMARY OF THE INVENTION

One aspect of the present invention alleviates the drawbacks referred to above by a method of estimating the density of mobile nodes of an ad hoc network in which each node moves along roads of a particular geographical network, the roads forming a plurality of intersections, and each mobile node being able to locate itself in the geographical network and adapted to maintain an up-to-date neighbor table containing information relating to the positions of its neighbor nodes.

The density of mobile nodes on each road between two successive intersections is determined during a first stage including:

a step of dividing the road into a plurality of coverage cells distributed in an adjacent manner, for example, along the road;

an intracellular counting step, during that at least one mobile node, preferably located in the vicinity of the center of a coverage cell and referred to as the principal node, determines, from its neighbor table local traffic density data including, for example, at least the number of mobile nodes inside that cell; and a step of aggregating the local traffic density data in each coverage cell to determine the density of the mobile nodes on the road.

An embodiment of the invention estimates the traffic density on a road in a totally decentralized manner. Using the principal nodes enables effective counting of nodes with no redundancy, given that a principal node is responsible for determining local traffic density data in each cell.

Dividing the road into a plurality of coverage cells defines for each cell a group of mobile nodes located inside that cell. In the particular situation where the principal node is a node located in the vicinity of the center of a coverage cell, it is from this fixed subdivision of the road that a mobile node able to locate itself at any time determines that it has principal node status and consequently knows that it must count the group of nodes associated with the cell to which it belongs. Thus a mobile node acquires principal node status autonomously, without requiring any additional centralized infrastructure. Other criteria can be used to select the principal node, for example the speed at which the node is moving, the time elapsed since it entered the cell, the proximity of its neighbor nodes, etc.

Counting the groups of mobile nodes associated with each cell provides a more refined characterization of traffic density, giving a spatial distribution of the mobile nodes on the road. In particular, local counting locates high mobile node densities on the road by identifying cells having such high densities.

According to one feature of the invention, during the aggregation step, a cell density packet (CDP) is sent from cell to cell with at least one principal node inserting into the cell density packet the number of mobile nodes of the cell to which it belongs.

The same cell density packet advantageously collects all the traffic density data available for the road concerned. This limits the number of packets it is necessary to send in order to send the information.

In a dense ad hoc network (i.e. one including a large number of nodes) with a highly dynamic topology, this avoids saturating the bandwidth allocated to the network. Accordingly, the method of the invention is particularly suited to urban environments.

According to another feature of the invention, the cell density packet is generated by a mobile node referred to as a generator node that has traveled the whole of the road connecting a source intersection to a destination intersection and is located in the vicinity of the destination intersection. Moreover, the cell density packet is sent cell by cell from the cell adjacent the destination intersection to the source intersection.

The cell density packet is generated at the destination intersection and then sent in the opposite direction to the direction in which the generator vehicle is moving, i.e. from the destination intersection to the source intersection. In this way each node liable to enter the road at the source interconnection in order to reach the destination intersection receives the cell density packet containing the latest known traffic density information for that road.

This information constitutes a reliable estimation of the traffic density on the road at the moment the node is at the entry of the road, given that a very short time (the time for the cell density packet to make its way back along the road)

elapses between the moment at which the cell density packet is generated and the moment at which it reaches the source intersection.

According to another feature of the invention, the generator node is a mobile node with principal node status that has previously modified a cell density packet.

Accordingly, of all the mobile nodes reaching the destination intersection in a given time interval, only one generates a cell density packet. In this way sending cell density packets is self-regulated and limited in time, and so the bandwidth of the network can be limited.

In a first implementation of the invention, during the subdivision step, each coverage cell is defined beforehand on a digital map representing the geographical area in association with an anchor point located at the center of that cell and the coordinates of which are stored. Moreover, during an aggregation step, the cell density packet is sent cell by cell according to the anchor points defined on the map representing the geographical network.

Because of the subdivision operation means, the node does not need to calculate the anchor point coordinates in real time. Because of this, this implementation is particularly advantageous if subdividing a road requires a large number of cells (for example if the road to be subdivided is long and/or the transmission range of the nodes is short). This implementation is particularly well suited to applications requiring a very short response time.

In a second implementation of the invention, during the subdivision step, the generator node calculates the geographical coordinates of anchor points corresponding to the center of each cell from a road length parameter and a mobile node transmission range parameter, and, during the aggregation step, the cell density packet is sent cell by cell according to the anchor points calculated during the subdivision step.

Effecting this subdivision in real time enables direct implementation of the invention in navigation systems using standard digital road maps without modification.

According to another feature of the invention, the size of each coverage cell is defined as a function of the transmission range of a mobile node.

If the radius of the coverage cell is at least equal to the transmission range of a mobile node, the set of neighbor nodes of a principal node of a cell advantageously correspond to the set of mobile nodes associated with that cell, which nodes are identified in the neighbor table of the principal node. Because of this, the principal node obtains the local traffic density data for this cell directly from its neighbor table. In other words, such subdivision obtains a local node density of a cell simply and efficiently from the neighbor table of a principal node.

According to another feature of the invention, the method of the invention further includes a step of analyzing traffic data contained in the cell density packet received at an intersection by calculating at least one characterization parameter of the traffic density on the chosen road selected from:
   the local mobile node density;
   the average mobile node density;
   the variance of the local mobile node density.

The average mobile node density and the variance of the local mobile node density are particularly suitable for characterizing the overall traffic density of a road.

The local density of mobile nodes (the total population of a group of nodes associated with a cell) is used in applications requiring subdivided traffic density information.

According to another feature of the invention, the method of the invention includes a signaling stage including:

a generation step during which a mobile node located at an intersection generates a signaling packet (road data packet (RDP)) from a cell density packet relating to a road if the traffic density on that road is above a predetermined threshold; and a step of sending the signaling packet to the principal node of each cell, each principal node broadcasting the signaling packet to its neighbor nodes.

Generating and broadcasting an RDP signaling packet relating to each road enables nearby mobile nodes to be informed in real time of traffic conditions on roads that they are liable to take.

Rather than generating an RDP signaling packet following analysis of each cell density packet, an RDP signaling packet relating to a road is generated only if the traffic density on that road exceeds a predetermined threshold. This limits the number of signaling packets sent over the network and avoids overloading the bandwidth of the network unnecessarily.

Dividing a road into cells the radius of which is at least equal to the transmission range of a mobile node optimizes the broadcasting of an RDP signaling packet by a principal node inside a cell. During a single broadcasting operation, the principal node sends the RDP signaling packet to the group of nodes associated with that cell that correspond to its neighbors.

According to another feature of the invention, the signaling packet is sent cell by cell in an area limited by a predetermined number of intersections to be crossed.

Each RDP signaling packet is transmitted inside a limited area and not throughout the network, and so the number of packets sent in the network can be limited and problems of bandwidth saturation when the network is dense avoided.

Another aspect of the invention is directed to a wireless communications terminal intended to form a mobile node of an ad hoc network including a plurality of mobile nodes moving along roads of a particular geographical network in which the roads form a plurality of intersections.

The terminal is associated with location means for determining its instantaneous position in the geographical network and means for maintaining an up-to-date neighbor table containing information relating to the positions of its neighbor nodes.

The terminal further includes:
   counting means for determining from its neighbor table local traffic density data including, for example, at least the number of mobile nodes in the cell to which it belongs;
   writing means for inserting the local traffic density data into a cell density packet; and
   means for receiving and sending said cell density packet.

According to another feature of the invention, the terminal further includes:
   means for generating the cell density packet when the terminal has traveled all of the road connecting a source intersection to a destination intersection and is located in the vicinity of the destination intersection;
   sending means for sending the cell density packet cell by cell from the cell adjacent the destination intersection to the source intersection.

According to another feature of the invention, the terminal of the invention further includes:
   means for calculating the geographical coordinates of anchor points corresponding to the centers of coverage cells preferably arranged adjacently along the circulation path; and
   means for inserting the geographical coordinates of the anchor points into the cell density packet.

Another aspect of the invention is directed to a method of routing data packets in an ad hoc network including a plurality of mobile nodes moving along roads of a particular geographical network in which the roads form a plurality of intersections.

The routing method includes a step of establishing a routing path for sending packets via at least some of the mobile nodes, the routing path being established as a function of real-time traffic conditions on the roads determined by the estimation method of the invention.

The steps of the estimation and signaling method of the invention can be executed by computer program instructions.

Another aspect of the invention involves a computer program including instructions for executing the steps of the estimation and signaling method described above when the program is executed by a processor of a communications terminal.

This program can use any programming language and take the form of source code, object code or a code intermediate between source code and object code, such as a partially-compiled form, or any other desirable form.

Another aspect of the invention is directed to a computer-readable storage medium storing a computer program including instructions for executing the steps of the estimation and signaling method described above.

The information medium can be any entity or device capable of storing the program. For example, the medium can include storage means, such as a ROM, for example a CD ROM or a micro-electronic circuit ROM, or magnetic storage means, for example a floppy disk or a hard disk.

Moreover, the information medium can be a transmissible medium such as an electrical or optical signal, which can be routed via an electrical or optical cable, by radio or by other means. The program of the invention can in particular be downloaded over an Internet type network.

Alternatively, the information medium can be an integrated circuit incorporating the program, the circuit being adapted to execute the estimation and signaling method of the invention or to be used in its execution.

Another aspect of the invention is directed to a signal intended to be transmitted via the mobile nodes of an ad hoc communications network, the signal conveying a cell density packet intended to be used by the method of the invention. The cell density packet includes:
- an identifier of the road associated with the cell density packet;
- an identifier of the coverage cells of the road;
- coordinates of a plurality of anchor points each associated with a coverage cell; and
- a field for storing traffic density data local to each coverage cell.

According to one feature of the invention, the cell density packet further includes the coordinates of a source intersection toward which the cell density packet is routed during the aggregation step of the method of the invention.

BRIEF DESCRIPTION OF THE DRAWINGS

Other features and advantages of the invention emerge from the following description of implementations of the invention, which is given by way of non-limiting example and with reference to the appended drawings, in which:

FIG. 3A is a flowchart showing one example of the first stage of a first implementation of the method of the invention;

FIG. 3B is a flowchart showing one example of the first stage of a second implementation of the method of the invention;

DETAILED DESCRIPTION OF IMPLEMENTATIONS OF THE INVENTION

The invention is described in detail below in the context of an intervehicular communications network comprising mobile nodes moving along roads of a road network.

As is known in the art, each mobile node is a terminal onboard a vehicle and able to communicate with neighbor nodes. The communications terminal includes a wireless communications interface, for example a Wi-Fi™ transceiver that uses the IEEE 802.11 protocol and has a maximum transmission range of approximately 300 meters.

The expression neighbor node when used herein when referring to a reference node means a node within the transmission range of the reference node.

The mobile node further includes means for identifying a road on which it is located, consisting of a digital road map representing the geographical road network in which it is moving.

The identification means are coupled to location means able to determine the instantaneous geographical position of the mobile node. The location means can consist of a GPS (Global Positioning System) receiver.

For greater compactness, the location means and the identification means can be integrated into the same communications terminal.

A mobile node of the invention further includes:
- means for keeping an up-to-date neighbor table storing information relating to its neighbor nodes, such as their positions and their speed and direction;
- counting means for determining from its neighbor table local traffic density data including at least the number of its neighbor nodes;
- writing means for inserting the local traffic density data into a cell density packet;
- means for receiving/sending cell density packets from/to other mobile nodes; and
- means for generating cell density packets.

The means described above are software means executed by calculation means of the communications terminal of the invention, for example a microprocessor.

Each mobile node maintains its own neighbor table, on the basis of HELLO messages exchanged periodically with its neighbor nodes conforming to the OLSR (Optimized Link State Routing) protocol.

Figure 1:
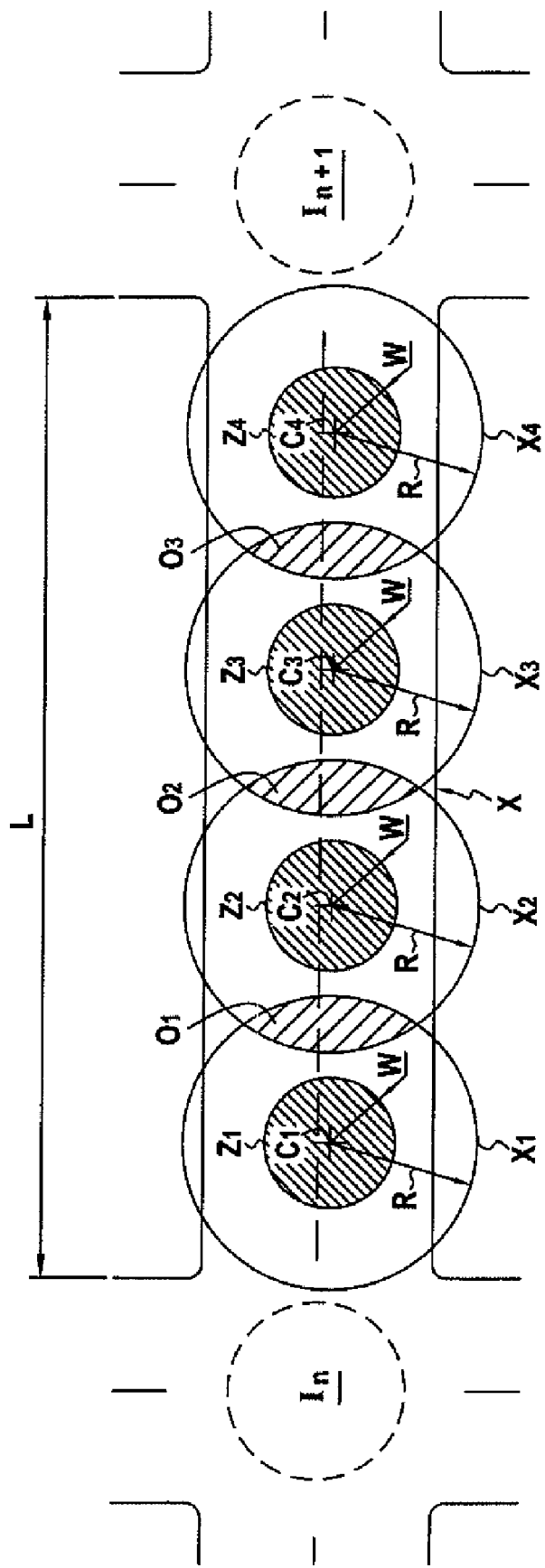
FIG. 1 is a diagram showing one example of subdividing a road in accordance with the present invention.

FIG. 1 is a diagram showing one example of subdivision in accordance with the invention of a road X connecting two consecutive intersections $I_n$ and $I_{n+1}$ of a road network.

For example, the road X is divided into four adjacent circular coverage cells $X_1, X_2, X_3, X_4$ with the same radius R. It should be noted that, generally speaking, each road of the road network is divided into an integer number k of adjacent coverage cells $X_1, \ldots, X_k$ the centers $C_1, \ldots, C_k$ of which are regularly distributed along the road X, so that the whole of the road X is covered continuously by the set of coverage cells $X_1, \ldots, X_k$, k being determined as a function of the length L of the road X and the transmission range D of a mobile node.

The center of each coverage cell $X_1, X_2, X_3, X_4$ of the road X is associated with a respective anchor point $C_1, C_2, C_3, C_4$ around that is defined a respective circular central area $Z_1, Z_2, Z_3, Z_4$ of radius W such that W<R. For simplicity, the centers $C_1, C_2, C_3, C_4$ of the coverage cells and the anchor points $C_1, C_2, C_3, C_4$ are denoted in the same way.

According to the invention, the value of the radius R of the coverage cells $X_1, X_2, X_3, X_4$ is equal to the transmission range Q of a mobile node of the network. In this way, the set of neighbor nodes of a node located at an anchor point corresponds to the set of nodes located inside the cell to which it belongs, thus forming a group of nodes associated with that cell.

In practice, according to the recommendations of the DSRC (Dedicated Short Range Communications) standard, the transmission range Q is a system parameter fixed at a value from 100 to 300 meters. In the present example, the optimum value of the range is Q=300 m. Obviously, this value can be adjusted as a function of the width of the roads to be covered. The value of this range Q can in particular be reduced if the density of the roads is high to avoid the same cell extending over a plurality of roads.

As shown in FIG. 1, the road X is divided in such a way that two consecutive cells $X_1$-$X_2$, $X_2$-$X_3$, $X_3$-$X_4$ (or groups of associated nodes) have a respective overlap area $O_1, O_2, O_3$ so that each node moving from a current cell to an adjacent cell belongs to at least one group of nodes. To ensure uninterrupted communication, each overlap area performs the handover procedure at the precise moment a mobile node passes from one cell to another.

Below, a mobile node of the ad hoc network is referred to a principal node when it is located at an anchor point, i.e. inside the central area $Z_1, Z_2, Z_3, Z_4$ of a coverage cell $X_1, X_2, X_3, X_4$. Given that each node knows its own instantaneous geographical position, supplied by a GPS receiver, it can determine at any time if it is in the central area $Z_1, Z_2, Z_3, Z_4$ of a coverage cell $X_1, X_2, X_3, X_4$, provided that it knows the coordinates of each anchor point $C_1, C_2, C_3, C_4$ on the road X on which it is moving.

The coordinates of these anchor points $C_1, C_2, C_3, C_4$ are obtained from the digital road map representing the road network during the operation of dividing the road X. The road can be divided beforehand (first variant) or in real time by a mobile node (second variant), as described below.

The method of the invention is described with reference to FIGS. 2, 3A, and 3B.

Figure 2:
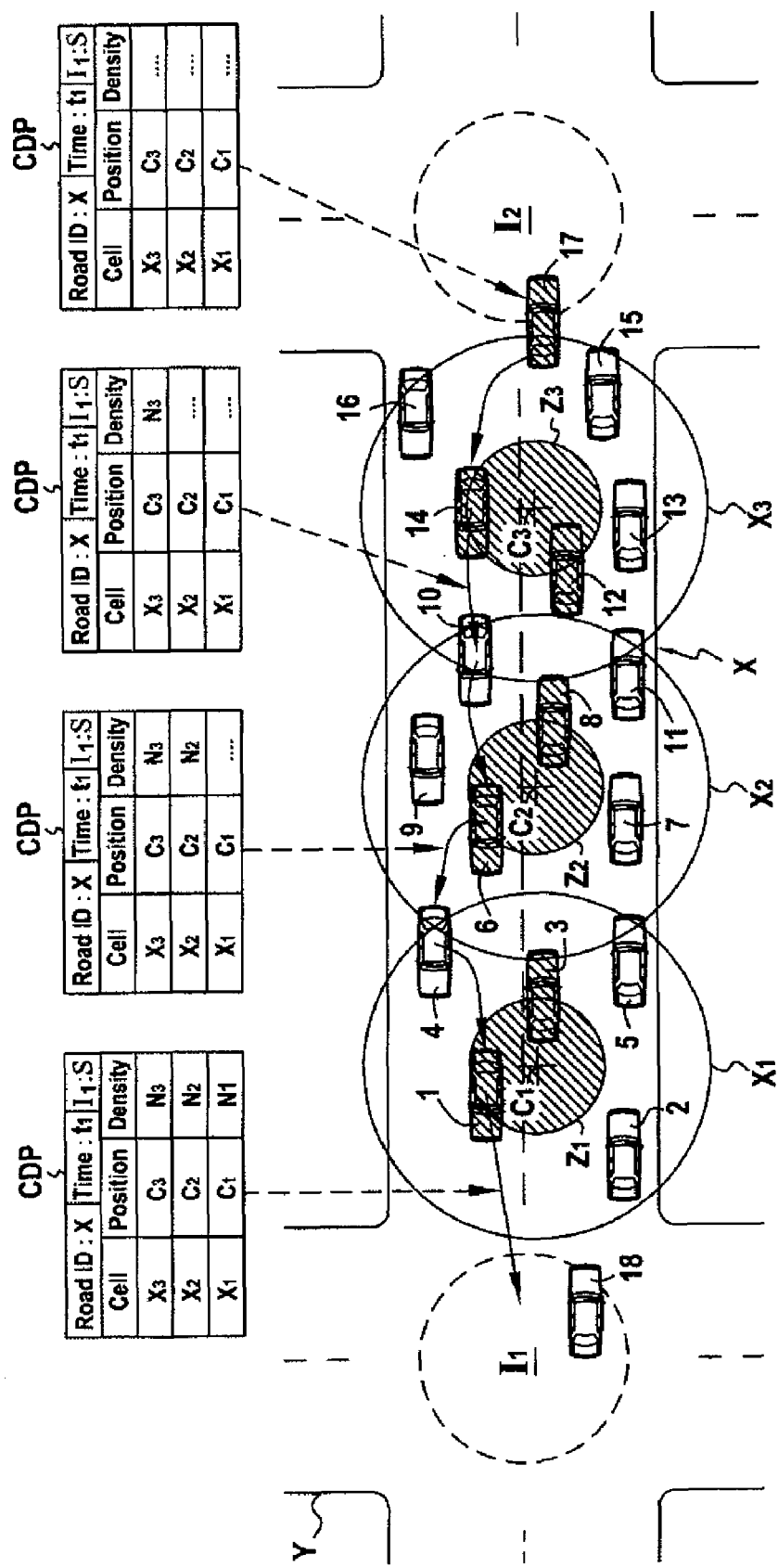
FIG. 2 is a diagram showing one implementation of a first stage of the method of the present invention.

During a first stage of the method of the invention, the mobile node density is determined on each road connecting two successive intersections, and in particular on the road X in FIG. 2 between a source intersection $I_1$ and a destination intersection $I_2$.

In this example, the road X is divided into three cells $X_1, X_2, X_3$ each including a respective anchor point $C_1, C_2, C_3$. On this road X there is shown a set of mobile nodes 1-17 moving on the road X at a given time $t_1$. Each coverage cell $X_1, X_2, X_3$ includes at least one principal node 1, 3, 6, 8, 12, 14 located at an anchor point.

A first variant of the first stage of the method of the invention, which determines the traffic density on the road X, is described below with reference to FIGS. 2 and 3A.

In this variant, the roads of the road network are subdivided beforehand, during a preliminary step E0, on a digital road map representing the road network.

The subdivision operation consists in determining, from the digital road map, the number of coverage cells $X_1, X_2, X_3$ necessary to cover the road X contiguously and the positions (geographical coordinates) of the corresponding anchor points $C_1, C_2, C_3$. The geographical coordinates of these anchor points $C_1, C_2, C_3$ are stored on the digital road map, in association with the identifier of each road, thus forming an enriched road map. The enriched map is then loaded into the onboard navigation device of the mobile node. This subdivision operation is performed for each road of the road network represented on the road map. Accordingly, for each road identifier, each mobile node knows beforehand a sequence of anchor points $\{C_3, C_2, C_1\}$ defining the positions of all the coverage cells associated with the road X.

Having traveled the whole of the road X from the source intersection $I_1$, to the destination intersection $I_2$, a mobile node 17 in the last cell $X_3$ adjacent the destination intersection $I_2$ is on the point of entering the destination intersection $I_2$. If that mobile node 17 has previously become the principal node of the cell $X_3$ in which it is located, then when it enters the destination intersection $I_2$ it acquires generator node status, during an election step E2 (election of a generator node). Afterwards, the node becomes a principal node as soon as it is located in the central area of a cell, in other words at the center of that cell.

During a generation step E4, the generator node 17 determined during the election step E2 generates a cell density packet (CDP) intended to combine the local traffic density data for each coverage cell.

The general structure or format of a cell density packet is described in Table 1 below, in which $N_1, \ldots, N_k$ are for example the number of nodes in the respective cells $X_1, \ldots, X_k$.

TABLE 1

Format of a cell density packet
Cell Density Packet (CDP)

| Identifier of current road (X) | Transmission time ($t_1$) | Source intersection ($I_1$) |
|---|---|---|
| Identifier of coverage cells | Position of center of coverage cells | Cell traffic density data |
| $X_1$ | $C_1$ | $N_1$ |
| $X_2$ | $C_2$ | $N_2$ |
| ... | ... | ... |
| $X_k$ | $C_k$ | $N_k$ |

When the mobile node 17 acquires generator node status during the election step E2, at time $t_1$, it immediately generates the cell density packet, into which it inserts:

the identifier X of the road on which it is still partially located and that it has just traveled, in the field "Identifier of current road";

the time $t_1$ corresponding to the time of generation of the cell density packet by the generator node 17, in the field "Transmission time";

the coordinates S of the source intersection $I_1$, in the field "Source intersection";

the identifier $X_1, X_2, X_3$ of each coverage cell $X_1, X_2, X_3$ of the road X, in the field "Cell identifier"; and the geographical coordinates (GPS references) of the anchor points $C_1, C_2, C_3$ corresponding to the center of each cell, in the field "Position of center of cell".

In the first implementation, the identifiers $X_1, X_2, X_3$ of the cells and the coordinates of the center of each of those cells (anchor points $C_1, C_2, C_3$) are stored on the digital road map previously loaded into the navigation device of each mobile node during the preliminary subdivision step E0. Accordingly, the generator node 17, knowing its position and therefore the identifier of the road X on which it is located, obtains the coordinates of the anchor points $C_1, C_2, C_3$ of the road X instantaneously by reading the digital map.

During an intracellular counting step E5, each principal node 1, 3, 6, 8, 12, 14 of a coverage cell $X_1, X_2, X_3$ determines from its respective neighbor table local traffic density data for each cell. Below, the expression local traffic refers to traffic within a coverage cell. Here the local traffic density data corresponds to the number $N_1, N_2, N_3$ of mobile nodes inside each cell, in other words the total population of the group of nodes associated with each cell.

Note that during the generation step E4 the generator node 17 leaves the field "Traffic density data" free for each cell identified in the cell density packet. This field is completed subsequently by a principal node of each coverage cell during an aggregation step E6.

During the aggregation step E6, the cell density packet is transmitted from the generator node 17 to the source intersection $I_1$ cell by cell, passing successively through the principal nodes 14, 6, 1 of the cells $X_3, X_2, X_1$.

As soon as the principal node 1 of the cell $X_1$ (the cell adjacent the first intersection $I_1$) has enriched the cell density packet by inserting therein the number $N_1$ of mobile nodes of the cell $X_1$, the cell density packet contains all the local traffic density data of each cell (i.e. the numbers $N_1, N_2, N_3$ of mobile nodes).

During a broadcasting step E8, the cell density packet is then broadcast across the source intersection $I_1$. To this end, the cell density packet is transmitted to all the nodes present at the source intersection $I_1$. In the FIG. 2 example, the cell density packet is received by the mobile node 18 located at the source intersection $I_1$, i.e. inside an area centered on the point with the coordinates S of the source intersection $I_1$.

When the cell density packet is received by at least one mobile node 18 at the first intersection $I_1$ (result of test step E10 positive), the first stage of the process terminates (final step E12). If not (result of test E10 negative), the broadcasting step E8 continues until the cell density packet is received by a mobile node at the source intersection $I_1$. In practice, if the cell density packet has not been received by a node at the end of a predetermined time, the cell density packet is abandoned (final step E12) as the traffic conditions on the road X may have changed drastically since the time $t_1$ of sending the cell density packet.

In a second variant of the method of the invention (FIG. 3B), the roads of the road network are divided in real time during a step E'0 by the generator node 17 determined during the election step E2.

To this end, a real-time subdivision function F is implemented by software executed by the navigation device of the generator node 17. This function generates the coordinates of the anchor points $C_1, C_2, C_3$ as a function of the identifier of the road X on which the generator node 17 is located, the length L of that road X, and the radius R of a coverage cell.

Having executed the real-time subdivision, during the step E'0, the generator node 17 generates the cell density packet as described above, during the generation step E4.

The difference relative to the first variant is that subdivision is not effected beforehand but in real time by a mobile node. Because of this, all the other steps E4, E5, E6, E8, E10, E12 described with reference to FIG. 3A in the context of the first variant are the same for the second variant, and consequently are not described again.

Real-time subdivision avoids each mobile node having to load beforehand into its onboard navigation device enriched digital navigation maps on which the anchor points for each road are stored. This second variant therefore enables use of the invention in navigation systems using standard digital road maps, i.e. non-enriched maps.

Figure 4:
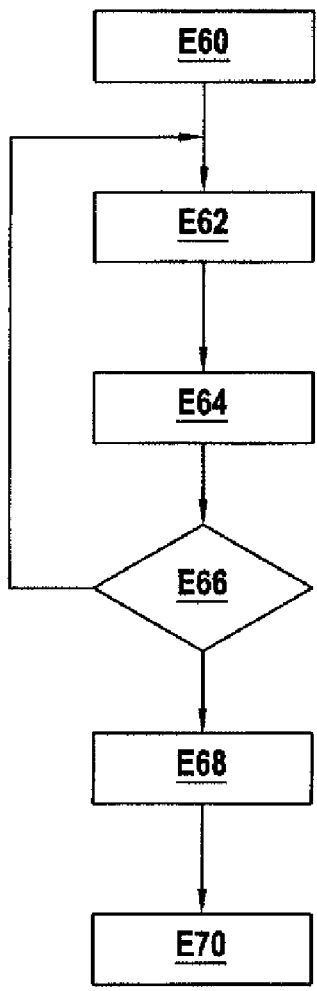
FIG. 4 is a flowchart showing one implementation of the step of the method of the present invention of aggregating traffic data.

The aggregation step E6 is described in detail below with reference to FIGS. 4 and 2.

During a verification substep E60, the generator node 17 verifies that the cell density packet contains the coordinates S of the anchor points $C_3, C_2, C_1$, and the coordinates of the source intersection $I_1$ determined during the preliminary subdivision step E0 (first variant) or in real time during the subdivision step E'0 (second variant). These coordinates are normally inserted during the step E4 by the generator node 17 generating the cell density packet as described above.

The coordinates of the anchor points $\{C_3, C_2, C_1\}$ and the coordinates S of the source intersection $I_1$ define a path to be followed by the cell density packet to reach the source intersection $I_1$. That path passes through the central area $Z_3, Z_2, Z_1$ of the respective coverage cells $X_3, X_2, X_1$.

During a transmission substep E62, the cell density packet is transmitted by a node that carries the packet to the next anchor point. In the FIG. 2 example, the cell density packet passes successively in transit through the principal nodes 14, 6, 1 at the center of the respective cells $X_3, X_2, X_1$.

When the cell density packet is received by a principal node, said node enriches the cell density packet during a writing substep E64 by inserting therein the number of nodes in its coverage cell.

Accordingly, the cell density packet is successively enriched by the principal nodes 14, 6, 1 of the respective cells $X_3, X_2, X_1$. Thus, as shown in FIG. 2, as the cell density packet passes in transit through the principal nodes 14, 6, 1, the numbers $N_3, N_2, N_1$ of nodes in the respective cells $X_3, X_2, X_1$ are successively inserted, and so the cell density packet has been totally completed when it is sent by the principal node 1 of the cell $C_1$, to the source intersection $I_1$.

As long as the cell density packet has not reached the last cell $X_1$ on the predefined path, i.e. the cell adjacent the first intersection $I_1$ (result of test step E66 negative), the transmission substep E62 and the writing substep E64 are chained in succession as described above.

As soon as the cell density packet reaches this last cell $X_1$ (result of test step E66 positive), the totally completed cell density packet is transmitted to the source intersection $I_1$ during a transmission substep E68.

The aggregation step E6 terminates when the cell density packet reaches the first intersection $I_1$ (final substep E70).

In the implementation described above, the counting step is carried out at regular time intervals by each coverage cell principal node. However, in a different implementation, the intracellular counting step E5 is included in the aggregation step E6 and carried out once and for all: for example, it is triggered by the reception of a cell density packet at a principal node.

Figure 5:
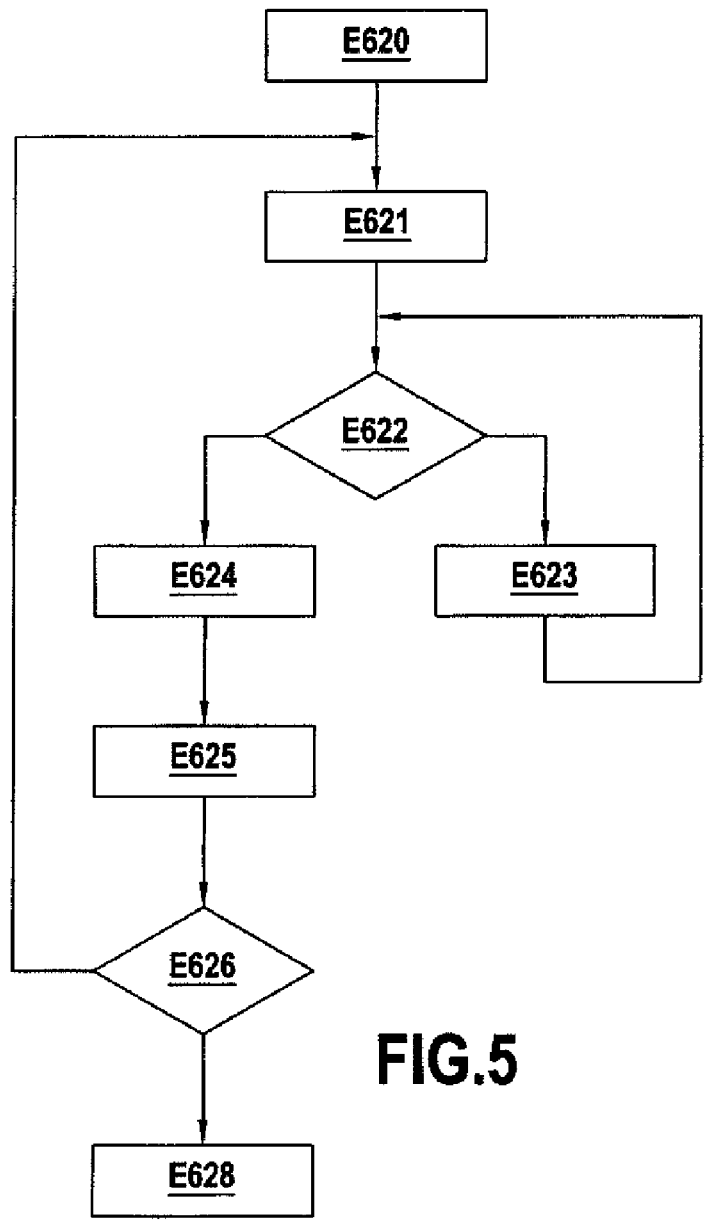
FIG. 5 is a flowchart showing one implementation of the step of the method of the present invention of sending a cell density packet.

The substep E62 of transmitting the cell density packet to the next anchor point is described in detail below with reference to FIGS. 5 and 2. This transmission substep E62 includes steps E620-E628 described below.

The transmission substep E62 begins when the node carrying the cell density packet CDP is ready to transmit the packet (step E620). In the FIG. 2 example, at the moment the cell density packet is generated by the generator node 17, it is the generator node 17 itself that is carrying the cell density packet and is ready to transmit the packet to the anchor point $C_3$.

During a selection step E621, the node carrying the packet selects from its neighbor table an integer number M of neighbor nodes moving in the direction of the first intersection $I_1$.

In the FIG. 2 example, the generator node 17 selects neighbor nodes 14, 16 moving toward the anchor point $C_3$.

If the carrier node has no neighbor node at this time, it retains the cell density packet that it is carrying in the direction of the first intersection $I_1$ during a carrying step E623, until it finds a neighbor node to which it can transmit the cell density packet. It should be noted that the cell density packet is always transferred to a mobile node moving in the direction of the source intersection $I_1$. This prevents the cell density packet moving away from the source intersection $I_1$.

If the carrier node has neighbor nodes moving in the direction of the first intersection $I_1$ and located nearer the next anchor point than the carrier node itself, in a selection step E624 it selects the neighbor node that is located nearest the next anchor point.

During a transmission step E625, the carrier node transmits the cell density packet to the neighbor node selected during the selection step E624.

If the packet is received by a principal node (result of test step E626 positive), the transmission substep E62 terminates (final step E628) and the process continues with execution of the writing step E64 described with reference to FIG. 4. If not (result of test step E626 negative), the carrier node repeats the steps described above.

In the FIG. 2 example, in a first time period, the generator node 17 transmits the cell density packet to the next anchor point $C_3$ (the anchor point nearest the node carrying the cell density packet).

To this end, the generator (carrier) node 17 selects from its neighbor table during the selection step E621 the neighbor nodes 14 and 16 moving in the direction of the source intersection $I_1$. Given that the carrier node 17 has at least one neighbor, in the selection step E624 it selects the neighbor node 14 nearest the next anchor point $C_3$. At this time the cell density packet contains no traffic density information. Given that this neighbor node 14 is the principal node 14 of the coverage cell $X_3$ (result of test E626 positive), the transmission substep E62 terminates (step E628) and, in the writing step E64, the principal node 14 inserts into the cell density packet the number $N_3$ of its neighbor nodes corresponding to the number of nodes located in the cell $X_3$.

In a second time period, during the transmission substep E62, the principal node 14 carrying the cell density packet transmits said packet to the next anchor point $C_2$. To this end, the principal (carrier) node 14 selects its neighbor node 10 moving in the direction of the source intersection $I_1$ (step E621) and nearest the anchor point $C_2$ (step E624) and sends it the cell density packet (step E625).

On reception of the cell density packet, the mobile node 10 selects, as described above, a neighbor node moving toward the source intersection $I_1$ (step E621) and nearest the anchor point $C_2$ (step E624), to which neighbor node it instantaneously transmits the cell density packet (step E625). In this example, this is the principal node 6 of the cell $X_2$. It should be noted that of the two principal nodes 6, 8 of the cell $X_2$, the principal node 6 is selected because it is moving in the direction of the source intersection $I_1$. During the writing step E64, the principal node of the cell $X_2$ inserts into the cell density packet the number of its neighbor nodes, corresponding to the number $N_2$ of nodes in the cell $X_2$. The cell density packet contains at this time traffic density information $N_1$ and $N_2$ relating to cells $X_1$ and $X_2$.

In a third time period, during the transmission substep E62, the principal node 6 of the cell $X_2$ transmits the cell density packet to the mobile node 4 of the cell $X_1$, which transmits it instantaneously and without modification to the principal node 1 of the cell $C_1$. To this end, the principal node 6 of the cell $X_2$ selects the neighbor node 4 moving toward the source intersection $I_1$ (step E621) and located nearest the next anchor point $C_1$ (step E624), and then sends it the cell density packet (step E625). As the cell density packet has been received by a principal node (result of test step E626 positive), the transmission step E62 is terminated (step E628).

During the writing step E64, the principal node 1 inscribes in the cell density packet the number of its neighbor nodes obtained from its neighbor table, that number corresponding to the number $N_1$ of nodes located in the coverage cell $X_1$. The cell density packet now contains the number of nodes $N_1$, $N_2$, $N_3$ in each cell $C_1$, $C_2$, $C_3$.

As the cell density packet has been received by the principal node 1 of the cell adjacent the source intersection $I_1$ (result of test step E66 positive), the cell density packet is transmitted to the source intersection $I_1$. To this end, the principal node 1 located in the central area $Z_1$ of the cell $X_1$ uses the coordinates of the source intersection $I_1$ previously stored by the node generator 17 in the cell density packet. The cell density packet is received by a mobile node 18 located at the source intersection $I_1$ and within range of the principal node 1 (final substep E70).

Figure 7:
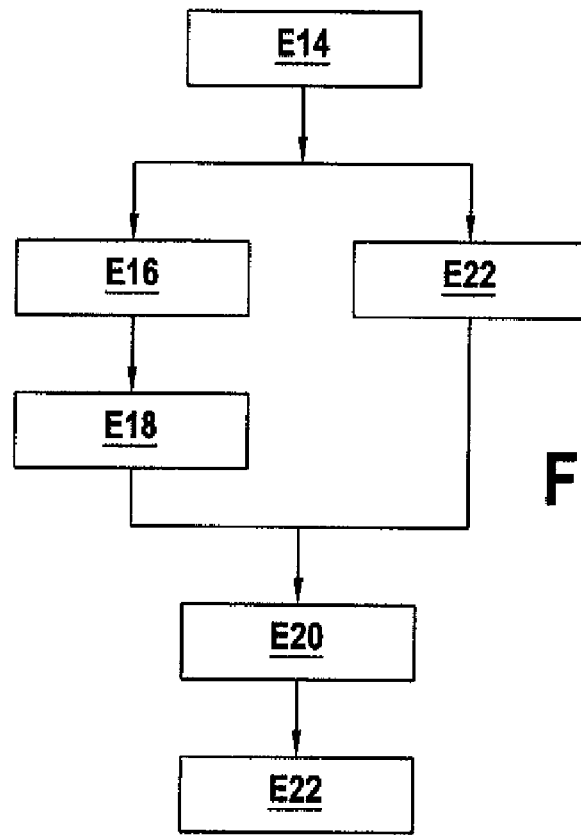
FIG. 7 is a flowchart showing one implementation of the step of the present invention of sending a cell density packet.
Figure 8:
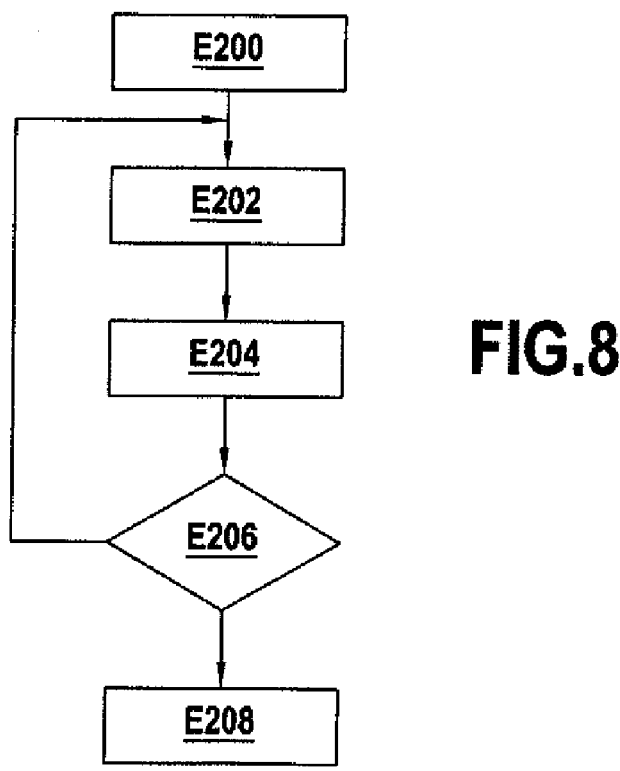
FIG. 8 is a flowchart showing the transfer of an RDP signaling packet along a road.

A second stage of the method of the invention is described below with reference to FIGS. 6, 7, and 8, during which second stage signaling messages consisting of road data packet (RDP) are generated and broadcast across the network to signal to the nodes of the network the roads that have a high node density. These RDP signaling messages are used to report traffic density conditions on certain roads of the road network.

Figure 6:
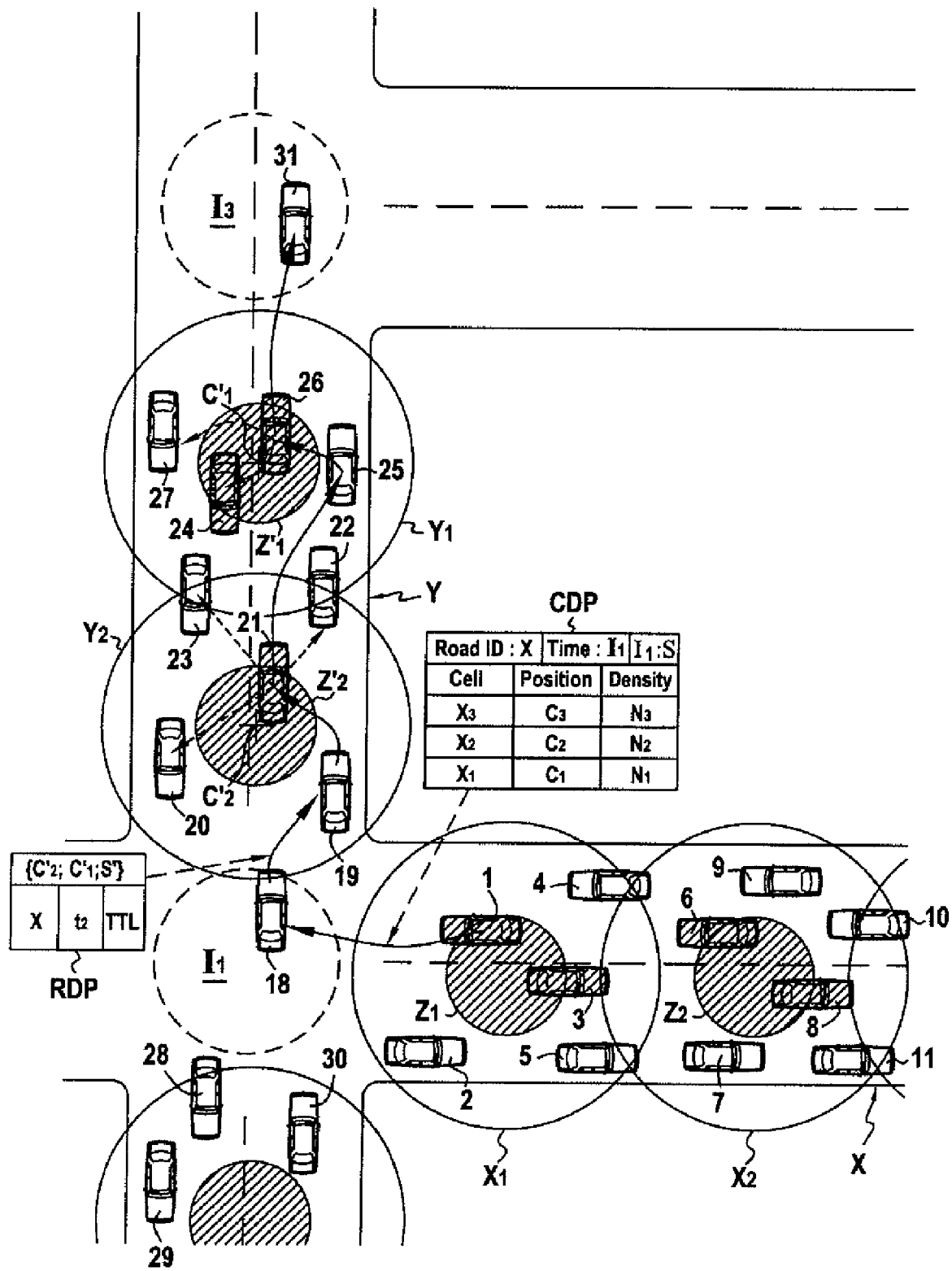
FIG. 6 shows one implementation of a second stage of the method of the present invention.

FIG. 6 represents diagrammatically the source intersection $I_1$ from before, formed by the road X crossing another road Y connecting the source intersection $I_1$ to another destination intersection $I_3$. The road Y was divided, during the subdivision step E0 (or E'0), into two coverage cells $Y_1$ and $Y_2$ in which a plurality of mobile nodes 19-26 are moving.

The second stage, during which the RDP signaling packet is broadcast, is described in detail below with reference to FIGS. 6 and 7.

During an initial step E14, a node located at the source intersection $I_1$ is on the point of entering the other road Y.

If it has received a cell density packet (step E16), it generates from that cell density packet an RDP signaling packet during a generation step E18. This applies to the node 18 that has received the cell density packet sent by the principal node 1 on the road $X_1$, as shown in FIG. 6.

The RDP signaling packet is generated only if the traffic density on the road from which it comes is above a predetermined reference threshold δ. In this example, the mobile node 18 receives only one cell density packet. However, in practice, the mobile node 18 is liable to receive a cell density packet from each road it is liable to enter.

Considering only the roads having a mobile node density above the predetermined threshold δ, the stream of RDP signaling packets sent by the mobile nodes at each intersection is minimized, which avoids overloading the bandwidth of the network.

On the basis of the RDP signaling messages that it generates or receives at an intersection, each mobile node maintains an up-to-date traffic information base (TIB) containing a list of roads with a high node density.

This traffic information base stores the identifiers of roads for which the mobile node density is above the threshold value δ, in association with their mobile node density, obtained by analyzing the cell density packet. A time parameter for time of day stamping the traffic density data for each road identified in the traffic information base is also stored, so that each node discards expired traffic data that is no longer valid. Below, a road is referred to as congested if its traffic density is above the predetermined threshold value δ.

Moreover, listing only congested roads considerably reduces the size of the traffic information bases stored at each node.

Assume that the road X is congested. The mobile node 18 at the source intersection $I_1$ then generates during the generation step E18 an RDP signaling packet that is stored in its traffic information base.

During a transfer step E20, the node 18 sends the RDP signaling packet on the other road Y, to advise the mobile nodes 20, 23, 24, 27 moving on that other road Y in the direction of the source intersection $I_1$ that the road X is congested. During this transfer step E20, the RDP signaling packet is transmitted along the road Y cell by cell, from the source intersection $I_1$ to the other destination intersection $I_3$. Transmission of the RDP signaling packet terminates when it is received by at least one node located at the other intersection $I_3$ during a final step E22.

Table 2 shows by way of example and in a general way the format of an RDP signaling packet generated after the analysis of a cell density packet by a mobile node located at an intersection.

TABLE 2

Format of a road data packet
Road Data Packet (RDP)
Path

| Identifier of road (X) | Transmission time ($t_2$) | TTL |
|---|---|---|

The analysis consists in calculating at least one characterization parameter of the traffic density on the chosen road from:
- the local mobile node density;
- the mean mobile node density;
- the variance of the local mobile node density.

For example, the local mobile node density on the road X is characterized by the following sequence H:

$$H = \left\{ X_1 : \frac{N_1}{\pi \cdot R^2}; X_2 : \frac{N_2}{\pi \cdot R^2} X_1 : \frac{N_3}{\pi \cdot R^2} \right\} \text{ and}$$

the mean density N of mobile nodes on the road X is equal to:

$$\frac{1}{3} \frac{(N_1 + N_2 + N_3)}{\pi \cdot R^2}.$$

During the generation step E18, the mobile node 18 generates the road data packet, into which it inserts:
- in a field "Identification of road", the identifier X of the road X whose traffic density N is above the reference threshold value δ (N>δ);
- in a field "Transmission time", the time $t_2$ corresponding to the time of day of generation of the road data packet or to the time of its transmission, given that it is sent as soon as it is generated; and
- in a field "TTL (Time To Live)", the number TTL of intersections that the road data packet has to cross before being ignored.

If N>δ it is possible to identify from the sequence H the cell that has the highest traffic density (or the highest number of nodes). This is particularly advantageous for locating a traffic jam on a road.

For example, TTL=3 means that the RDP signaling packet will not be transmitted beyond three successive intersections. Each time an intersection is crossed, the value of TTL is decremented by 1. If TTL=0, the road data packet is ignored and is therefore not forwarded any further.

Accordingly, each RDP signaling packet is transmitted over an area limited to three intersections. This avoids providing traffic density information that would not be valid at the time of reception. Using the parameter TTL therefore limits the number of packets sent over the network and thus prevents the problem of bandwidth saturation if the network is dense.

It should be noted that the road data packet generated by a mobile node located at an intersection is transmitted during the transfer step E20 at the moment the mobile node leaves the intersection and enters a road. In the FIG. 2 example, the RDP signaling packet is sent at the moment the node 18 leaves the source intersection $I_1$ and enters the other road Y. By carrying the RDP signaling packet to the entry point of the road Y, the node avoids transmitting the road data packet to a node whose movement is difficult to predict given that it is at an intersection.

The transfer step E20 is described in detail below with reference to FIGS. 6 and 8.

During an initial substep E200, when the node 18 (the generator node carrying the signaling packet) enters the road Y, it inserts in a field "Path" of the RDP signaling packet a sequence of coordinates defining a path to be taken by the RDP signaling packet during the transfer step E20. This sequence contains the coordinates of the anchor points $C'_2$, $C'_1$ associated with that road Y and the coordinates S' of the other destination intersection $I_3$ to be reached. The anchor points $C'_1$, $C'_2$ corresponding to the center of the respective coverage cells $Y_1$, $Y_2$ are determined during the subdivision step E0 or E'0 described above.

During a transmission substep E202, the RDP signaling packet is transmitted toward the anchor point $C'_2$ associated with the coverage cell $Y_2$. This transmission substep E202 is effected in same manner as the transmission substep E62 described above with reference to FIG. 5 in the context of transmitting a cell density packet.

In a broadcasting substep E204, the principal node 21 that has received the RDP signaling packet broadcasts it to its neighbor nodes 19, 20, 22, 23, in other words to the group of mobile nodes associated with the coverage cell $Y_2$.

The transmission substep E202 and the broadcast substep E204 are repeated to transmit the RDP signaling packet cell by cell until is reaches the other destination intersection $I_3$.

As soon as the RDP signaling packet reaches the cell $Y_1$ adjacent the other destination intersection $I_3$ (result of test step E206 positive), the transfer step E20 terminates (final substep E208).

In the FIG. 6 example, after it has broadcast the RDP signaling packet via the coverage cell $Y_2$ (step E204) the principal node 21 of the cell $Y_2$ transmits it to the anchor point $C'_1$ associated with the cell $Y_1$. The road data packet is received by the mobile node 25 moving toward the other destination intersection $I_3$ located nearest the anchor point $C'_2$. The mobile node 25 being a principal node of the cell $Y_1$, it broadcasts the RDP signaling packet to its neighbor nodes 22, 23, 24, 27 (step E204) and then transmits the road data packet to a node 31 located at the other destination intersection $I_3$.

It should be noted that cell density packets and RDP signaling packets are routed using a greedy forwarding strategy that forwards the packet successively from node to node along the path predefined by the anchor point. Given this forwarding strategy, a node carrying a packet is always seeking to forward that packet to a target neighbor node that is nearer the anchor point. As soon as the packet is received, the target neighbor node in turn becomes a carrier node that in turn seeks to forward the packet to a neighbor node, and so on.

INDUSTRIAL APPLICATIONS

A first example of application of the invention is described below with reference to FIG. 9. This example relates to the routing of data packets in an intervehicular communications network including mobile nodes 50, 60 each of which is a mobile terminal of the invention onboard a vehicle moving on roads forming a plurality of intersections J, $J_1$-$J_8$.

In this example, the method of the invention is implemented in a routing protocol for transmitting data packets between nodes of the network.

Taking into account the traffic density information provided in the cell density packets, routing paths for the data packets can be calculated in real time by identifying roads with a high node density that constitute transmission axes with very high connectivity. These transmission axes constitute preferred axes through which the data packets can pass in transit in an optimum manner (ideal for transmitting data streams requiring a high quality of service).

In this example, it is considered that at a given time a source vehicle 50 located at a current intersection J is carrying a data packet P that it requires to transmit to a destination vehicle 60 located at this time near an intersection $J_7$. To this end, the source vehicle 50 selects an intermediate intersection $J_1$ or $J_2$ or $J_3$ after the current intersection J, to which it transmits the data packet P. This selection takes into account the curvilinear length of the path $U_1$, $U_2$, $U_3$ to take from the intermediate intersection to the destination vehicle 60 and the mobile node traffic density on the road connecting the current intersection J to the respective intermediate intersection $J_1$, $J_2$, $J_3$.

Being situated at the current intersection J, the source vehicle 50 receives by the method the invention cell density packets coming from adjacent roads connecting the intersections J and $J_1$; J and $J_2$; J and $J_3$. Following analysis of the content of the various cell density packets, the source 50 determines the traffic density on the associated roads and selects the intermediate intersection that is nearest the destination vehicle 60 and has the highest connectivity with the current intersection J.

Figure 9:
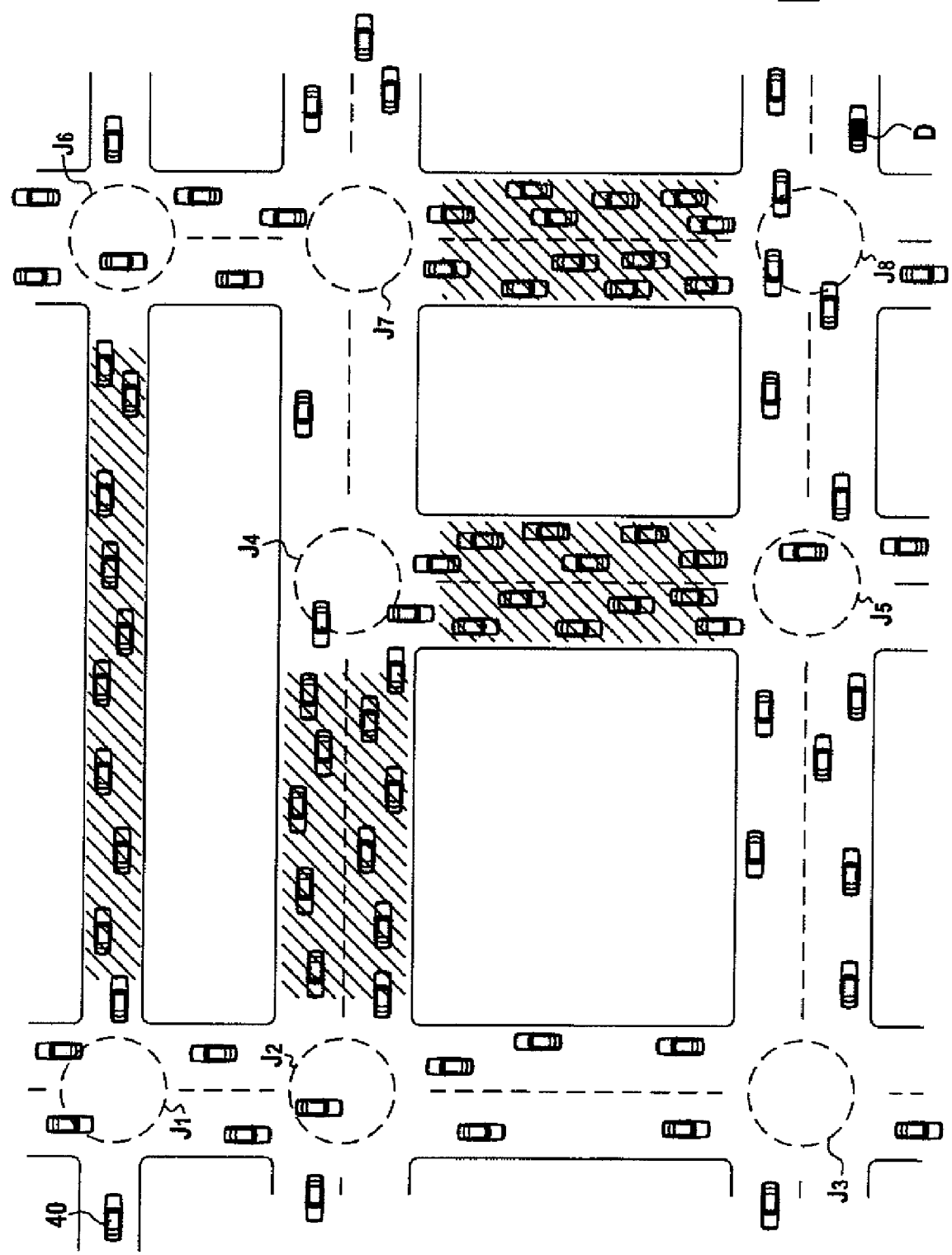
FIG. 9 is a diagram showing an intervehicular communications network in which the method of the invention is used to route data packets.

In the FIG. 9 example, the source vehicle 50 selects the intersection $J_2$ given that the path $U_2$ connecting the intermediate intersection $J_2$ to the destination vehicle 60 is minimal and that the traffic density on the road connecting the current intersection J to the intermediate intersection $J_2$ is optimal. The length of the path $U_2$ is less than that of the paths $U_1$ and $U_3$ to the destination vehicle 60 from the respective intermediate intersections $J_1$ and $J_3$. The mobile node density on the road connecting the current intersection J to the intermediate intersection $J_2$ is greater than the mobile node traffic densities on the roads connecting the intersections J-$J_1$ and J-$J_3$.

In the context of this application example, it should be noted that RDP signaling packets are not necessary, since at a current intersection the only traffic information necessary is the mobile node densities on the roads adjacent the current intersection. The source vehicle 50 carrying the data packet P to be transmitted selects an intermediate intersection on the basis of the local traffic densities supplied by the cell density packets for the adjacent roads.

Figure 10:
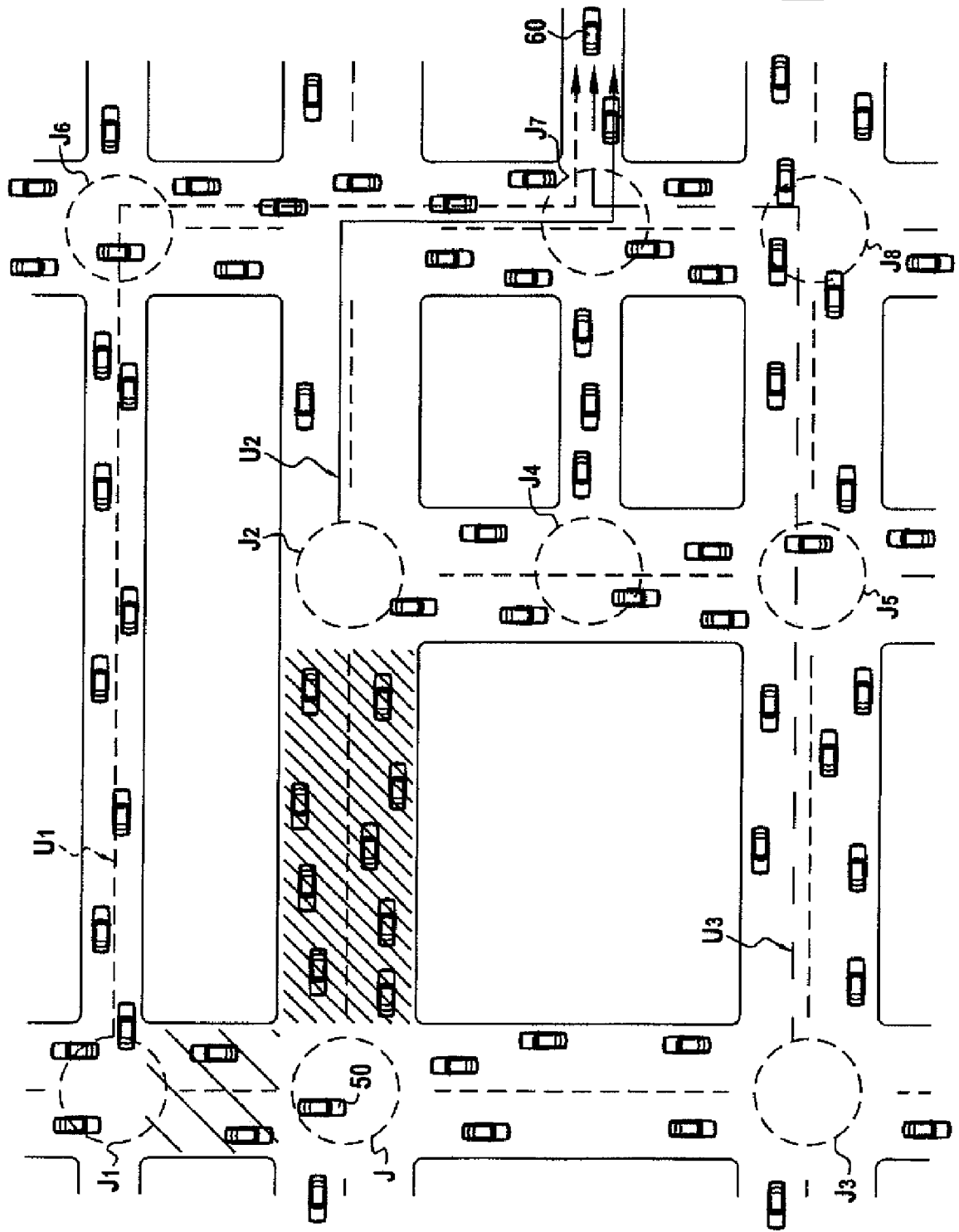
FIG. 10 is a diagram showing an intervehicular communications network in which the method of the invention is used to navigate a mobile node.

A second example of application of the method of the invention is described below with reference to FIG. 10. This application example relates to a system for detecting and reporting traffic jams in real time to improve navigation in a road network.

The method of the invention is implemented by an onboard navigation system at each node of the network, adapted to identify congested roads from the cell density packets and to advise the nodes of the network of them in real time using RDP signaling packets in accordance with the invention. As a function of the traffic density information disseminated through the network by means of these packets, the onboard navigation system of a node can at all times define an appropriate itinerary, avoiding congested roads. The road network of FIG. 10 includes eight intersections $J_1$-$J_8$ formed by the crossing of a plurality of roads on which mobile (vehicles equipped with a mobile terminal of the invention) nodes are circulating.

It is assumed that a vehicle 40 located at a starting intersection $J_1$ wishes to reach an arrival intersection $J_8$. By means of generating RDP signaling packets and exchanging them between the nodes of the network by the method of the invention, the vehicle 40 is informed that the roads connecting the intersections $J_1$-$J_6$; $J_2$-$J_4$; $J_4$-$J_5$; $J_7$-$J_8$ are congested. It is assumed here that the parameter TTL=3, so that any RDP signaling packet crosses at most three intersections before being abandoned. Accordingly, the vehicle 40 can receive RDP signaling packets that were sent at the intersections $J_7$, $J_6$, $J_5$, $J_4$. Accordingly, the parameter TTL=3 limits the broadcasting of the RDP signaling packets to an area limited by a predetermined number of intersections to be crossed.

Taking account of this information, the navigation system of the vehicle 40 calculates an itinerary avoiding congested roads. In this example, the vehicle 40 does not receive an RDP signaling message coming from roads connecting the intersections $J_1$-$J_2$; $J_2$-$J_3$; $J_3$-$J_5$; $J_5$-$J_8$, given that the traffic density on these roads is less than the predetermined threshold value δ. Consequently, these roads are considered not congested and the navigation system can take them into account to establish the itinerary of the vehicle 40. In this example, the itinerary calculated therefore passes through the intersections $J_1$-$J_2$-$J_3$-$J_5$-$J_8$.

In both application examples described above, the method of the invention estimates the mobile node density on each road in real time so as to identify roads that have a high node traffic density.

It should be noted that in the first application example roads of high traffic density are looked for so that the data packets transit optimally, whereas in the second application example such roads are avoided to optimize the travel time of the vehicle.

The method of the invention is particularly suited to intervehicular communications networks in dense urban environments, but can be applied to other types of ad hoc mobile networks that require traffic density estimation and signaling in real time.

The invention claimed is:

1. A method of estimating a density of mobile nodes of an ad hoc network in which the mobile nodes move along roads of a particular geographical network, at least some mobile nodes being configured to locate themselves in the geographical network and configured to maintain an up-to-date neighbor table including information relating to positions of their neighboring mobile nodes, wherein a density of the mobile nodes on a road is determined by the steps of:
    subdividing said road into coverage cells;
    executing an intracellular count at one of said coverage cells during which a mobile node located in a predetermined central area of a coverage cell comprising a principal node determines from its neighbor table local traffic density data; and
    performing an aggregation, during which said principal node inserts the determined local traffic density data into a cell density packet.

2. The method according to claim 1, wherein, during said aggregation, the principal node inserts into said cell density packet a number of the mobile nodes of its cell and transmits said cell density packet to a principal node of a neighbor coverage cell.

3. The method according to claim 2, wherein said roads form intersections between themselves;
    wherein the cell density packet is generated by a generator mobile node that has traveled an entirety of a road connecting a source intersection to a designation intersection and is located near the destination intersection; and
    wherein the cell density packet is transmitted cell by cell from a cell adjacent the destination intersection to the source intersection.

4. The method according to claim 3, wherein the generator mobile node is a mobile node that, as a principal node, has previously modified the cell density packet.

5. The method according to claim 1, wherein said coverage cells are predefined on a digital map representing the particular geographical network in association with anchor points located at centers of said coverage cells and coordinates of which are stored, and during the aggregation the cell density packet is transmitted from cell to cell in accordance with the anchor points defined on the digital map representing the particular geographical network.

6. The method according to claim 3, wherein the generator mobile node calculates geographical coordinates of anchor points corresponding to centers of said coverage cells from a length parameter of the road and a transmission range parameter of the mobile node, and during the aggregation the cell density packet is transmitted from cell to cell in accordance with the anchor points calculated by said generator mobile mode.

7. The method according to claim 5, further comprising:
    analyzing traffic density data contained in the cell density packet received at an intersection, the analysis including calculating at least one parameter characterizing the local traffic density on the road selected from:
    a local mobile node density;
    a mean mobile node density; and
    a variance of the local mobile node density.

8. The method according to claim 2, wherein said method further includes a signaling stage including:
    generating, by a mobile node located at an intersection, a signaling packet from a cell density packet relating to the road if the traffic density on said road is above a predetermined threshold; and
    transmitting said generated signaling packet to principal nodes of said coverage cell, a principal node broadcasting the signaling packet to its neighbor mobile nodes.

9. The method according to claim 8, wherein the signaling packet is transmitted from cell to cell in an area defined by a predetermined number of intersections to be crossed.

10. A method of routing data packets in the ad hoc network including the mobile nodes moving along the roads of the particular geographical network, said method including establishing a routing path to at least some of the mobile nodes for transmission of packets, said routing path being established as a function of mobile node densities on the road determined by the estimation method according to claim 1.

11. A wireless communications terminal configured to form a mobile node of an ad hoc network including mobile nodes moving on roads of a particular geographical network, said wireless communications terminal being associated with means for determining a location of said wireless communications terminal in the geographical network and means for maintaining an up-to-date neighbor table including information relating to positions of its neighboring mobile nodes, wherein said wireless communications terminal further includes:
    intracellular counting means for determining from its neighbor table local traffic density data at a coverage cell of a road divided into a plurality of said coverage cells, said intracellular counting means being utilized when the wireless communications terminal is located in a predetermined central area of said coverage cell;
    writing means for inserting said local traffic density data into a cell density packet; and
    means for receiving and transmitting said cell density packet.

12. A process in which a computer executes instructions set forth in a computer program executing on a processor which, when used on the computer, causes the processor to estimate a density of mobile nodes of an ad hoc network in which the mobile nodes move along roads of a particular geographical network, the computer program comprising:
    program code for subdividing a road into coverage cells;
    program code for executing an intracellular count at one of said coverage cells during which a mobile node located in a predetermined central area of a coverage cell comprising a principal node determines, from its neighbor table, local traffic density data; and
    program code for performing an aggregation, during which said principal node inserts the determined local traffic density data into a cell density packet.

13. A non-transitory computer-readable storage medium encoded with a computer program executed by a computer that causes estimation of a density of mobile nodes of an ad hoc network in which the mobile nodes move along roads of a particular geographical network, the computer program comprising:
    program code for subdividing said road into coverage cells;
    program code for executing an intracellular count at one of said coverage cells during which a mobile node located in a predetermined central area of a coverage cell comprising a principal node determines from its neighbor table local traffic density data; and program code for performing an aggregation, during which said principal node inserts the determined local traffic density data into a cell density packet.

14. The method according to claim 1, wherein said cell density packet includes:
an identifier of a road associated with the cell density packet;
an identifier of coverage cells belonging to said road;
coordinates of anchor points each associated with a coverage cell; and
at least one field for storing traffic density data local to at least one of said coverage cells.

* * * * *